United States Patent [19]

Drutchas et al.

[11] Patent Number: 4,623,031
[45] Date of Patent: Nov. 18, 1986

[54] CONTROL APPARATUS FOR A STEERING SYSTEM

[75] Inventors: Gilbert H. Drutchas, Birmingham; David J. Suttkus, Utica, both of Mich.

[73] Assignee: TRW Inc., Cleveland, Ohio

[21] Appl. No.: 704,496

[22] Filed: Feb. 22, 1985

[51] Int. Cl.[4] .................................................. B62D 5/08
[52] U.S. Cl. .................................... 180/148; 91/433; 91/465
[58] Field of Search .............. 180/148, 147, 143, 142, 180/141, 132; 91/433, 465, 403, 410, 398

[56] References Cited

U.S. PATENT DOCUMENTS

| | | | |
|---|---|---|---|
| 1,826,450 | 10/1931 | Bragg et al. | 188/357 |
| 2,619,037 | 11/1952 | O'Connor et al. | 417/316 |
| 2,893,504 | 7/1959 | Jackson | 180/143 |
| 3,222,995 | 12/1965 | Reed | 91/359 |
| 3,360,932 | 1/1968 | Lech et al. | 60/386 |
| 3,841,653 | 10/1974 | Strauff | 280/709 |
| 3,998,571 | 12/1976 | Falke | 417/569 |

Primary Examiner—John A. Pekar
Attorney, Agent, or Firm—Yount & Tarolli

[57] ABSTRACT

A steering apparatus is disclosed having a direction control valve for directing pressurized fluid to a hydraulic, power steering motor in a steerable vehicle. A piston in the hydraulic motor is mechanically connected to an operator steering wheel and to the vehicle wheels. Manual turning of the steering wheel effects initial piston movement and steering of the vehicle wheels. Upon initiation of a steering maneuver by manual operation of the steering wheel of the vehicle, piston movement causes the hydraulic motor to produce a pressure differential signal. The direction control valve responds to the pressure signal from the hydraulic motor and directs pressurized fluid from the power steering pump to the side of the hydraulic motor that is lower in fluid pressure.

10 Claims, 12 Drawing Figures

CONTROL APPARATUS FOR A STEERING SYSTEM

TECHNICAL FIELD

The present invention relates to a steering system and partucularly to a control apparatus for directing fluid to a hydraulic, power steering motor.

BACKGROUND ART

Normally, in an automotive vehicle, the vehicle is steered by turning a steering wheel. When the steering wheel is turned, the vehicle wheels are turned through the action of a steering gear such as a rack and pinion gear set. In a hydraulic, power assist system, a hydraulic motor is coupled to the steering gear set to assist the operator by reducing the manual effort required to steer the vehicle.

A typical hydraulic, power assist, steering system includes a power steering pump, a valve which is actuated upon turning of the steering wheel, and a hydraulic motor controlled by the valve. The hydraulic motor is connected to a steering gear element and provides assistance to the operator's manual steering effort.

The power steering pump is driven by the vehicle engine. The valve is interposed between the pump and the hydraulic motor to control flow of pressurized fluid from the pump to the hydraulic motor. The valve responds to steering maneuvers to control (i) the direction of fluid flow to the steering motor and (ii) the volume of the fluid flow.

Maximum vehicle steering efforts usually occur at zero or low vehicle speeds, such, as during dry surface parking. Power steering pumps are typically designed to deliver sufficient fluid flow and pressure at low engine speeds to the hydraulic motor to insure adequate steering assistance.

Power steering pumps typically provide increasing output flow as pump speed increases up to a predetermined speed, and thereafter provide a substantially constant output flow. Such flow characteristics are achieved by different pump constructions. Typical pump constructions are shown in U.S. Pat. Nos. 4,014,630; 3,817,266; and U.S. patent application Ser. No. 381,702 filed May 25, 1982.

Electronically controlled valves have been developed for use in hydraulic power assist steering systems. Such electronic controls typically have separated the two control functions, one being fluid flow direction control and the other being flow rate control. Fluid flow direction control in such electronically controlled valves is accomplished by the use of a solenoid. Valves that control fluid flow direction are subject to high fluid pressures and consequently have substantial flow forces acting thereon. As a result, the valve solenoid is typically large and has large power requirements.

DISCLOSURE OF THE INVENTION

The invention provides a new control apparatus for directing fluid flow to and from a hydraulic motor in a power steering system. The new apparatus is designed to have a directional control valve hydraulically coupled to the hydraulic motor and actuatable in response to fluid pressures within the hydraulic motor.

The apparatus in accordance with the present invention includes a connection means for mechanically connecting the operator steering wheel to the steerable vehicle wheels. Turning of the steering wheel initiates steering of the vehicle wheels. A power steering pump provides pressurized fluid. A hydraulic motor is connected to a steering member for the vehicle wheels and is actuatable by fluid pressure from the power steering pump. When the steering wheel is turned, a piston within the hydraulic motor is moved and the hydraulic motor produces a pressure signal in response thereto. A valve means in fluid communication with the pump and the hydraulic motor controls fluid flow to the hydraulic motor. The valve means has a neutral condition and an actuated condition. The actuated condition directs pressurized fluid to the hydraulic motor. The valve means is actuatable to the actuated condition in response to the pressure signal from the hydraulic motor.

In a preferred embodiment, the apparatus includes a reservoir for holding fluid and a power steering pump for supplying fluid under pressure. An electronically controlled flow control valve is provided between the reservoir and the pump for controlling the volume of fluid flowing from the pump. A directional control valve is provided to direct fluid to and from two chambers of the hydraulic, power steering motor responsive to fluid pressure in the chambers. Pressure in the chambers of the hydraulic motor changes upon movement of a piston dividing the steering motor into the chambers through a mechanical connection between the steering wheel and the piston. One chamber of the hydraulic motor decreases in volume and increases in pressure and the other chamber of the hydraulic motor increases in volume and decreases in pressure. Fluid is directed by the directional control valve from the pump to the chamber of the hydraulic motor decreasing in fluid pressure. The pressurized fluid from the pump directed to the chamber decreasing in pressure acts against a piston face associated with that chamber to assist the manually initiated movement of the piston and steering member. Fluid from the chamber increasing in pressure due to decreasing volume is directed by the directional control valve to the reservoir.

BRIEF DESCRIPTION OF THE DRAWINGS

Other features and advantages of the invention will be apparent to those skilled in the art by reference to the following detailed description taken in connection with the accompanying drawings wherein.

BEST MODE FOR CARRYING OUT THE INVENTION

Figure 1:
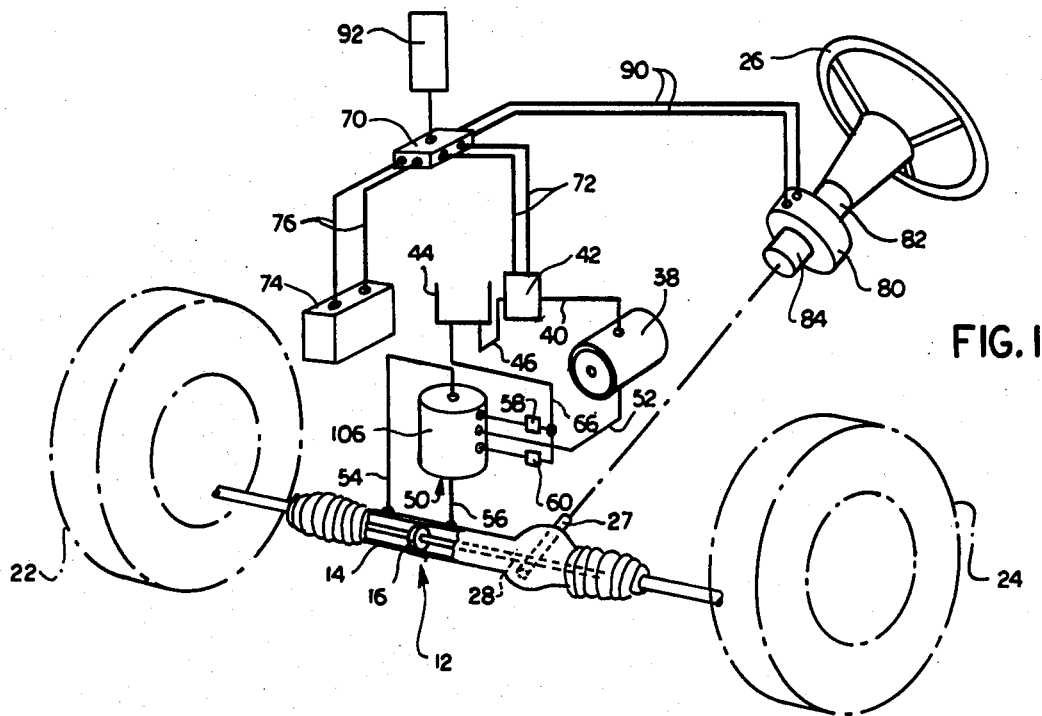
FIG. 1 is a schematic illustration of a steering apparatus constructed in accordance with the present invention.
Figure 3:
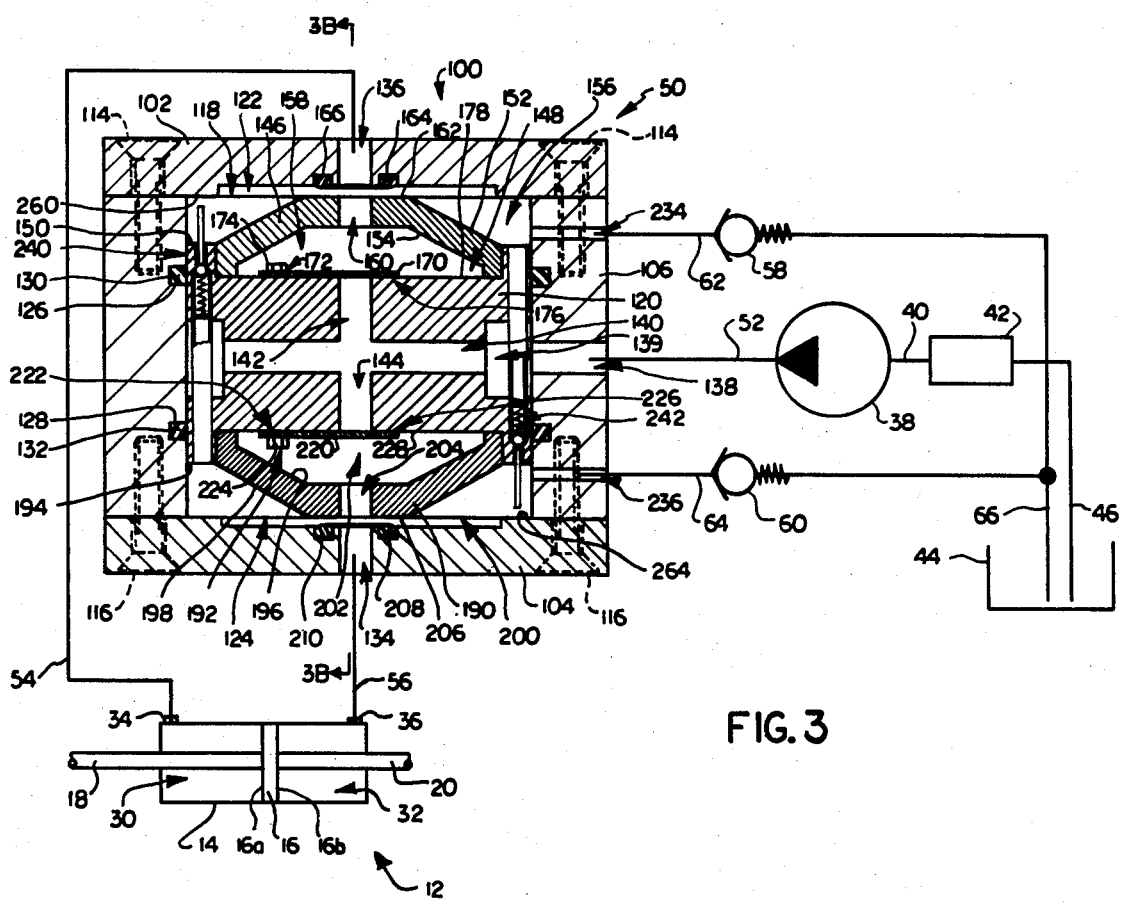
FIG. 3 is a partial fragmentary view and partial schematic illustration of the directional control valve assembly used in the steering apparatus of FIG. 1.

Referring to FIGS. 1 and 3, a hydraulic power steering motor 12 includes a cylindrical housing 14 containing a movable piston 16 having opposite faces 16a, 16b. Piston 16 has shafts 18, 20 fixed to the faces 16a, 16b, respectively, and connected to vehicle wheels 22, 24, respectively, in a known manner.

An operator steering wheel 26 is mechanically coupled to a pinion gear 27, which is in driving engagement with a rack portion 28 of shaft 20 in a known manner. Rotational motion of the steering wheel 26 mechanically rotates the pinion 27 which drives the rack 28, shaft 20, piston 16 and shaft 18, which in turn effects steering motion of wheels 22, 24.

The piston 16 divides the cylindrical housing 14 into two chambers 30, 32. Chambers 30, 32 vary in volume as a function of the position of piston 16 within the housing 14. The chambers 30, 32 have hydraulic, connection ports 34, 36, respectively.

A hydraulic pump 38 for providing pressurized fluid is mechanically driven in a known manner from the vehicle engine (not shown) by a drive belt (not shown) connected to a pulley (not shown) of the hydraulic pump 38. The inlet of pump 38 is connected by a conduit 40 to an electronically controlled inlet valve 42. The inlet valve 42 is connected to a reservoir 44 by a conduit 46. The inlet valve 42 is utilized to control the volume of fluid flowing from the pump 38. Such an inlet valve is disclosed in pending U.S. patent application Ser. No. 496,619, filed May 20, 1983, now U.S. Pat. No. 4,557,342, which is hereby fully incorporated herein by reference.

The outlet of the hydraulic pump 38 is connected to a directional control valve 50 through a conduit 52. The control valve 50 is connected to ports 34, 36 of chambers 30, 32 through conduits 54, 56, respectively. The directional control valve 50 is connected to check valves 58, 60 by conduits 62, 64, respectively, and are both connected to the reservoir 44 through conduit 66.

An electronic control unit 70 controls the throttling of the inlet valve 42 in response to certain vehicle operating perameters. The inlet valve 42 is connected to the electronic control unit 70 by wires 72. The electronic control unit 70 is further connected to the vehicle battery 74 by wires 76 to provide operating power for the electronic control unit 70.

A torque sensor 80 is disposed between a first steering shaft section 82 and a second steering shaft section 84 which are operatively connected to the operator steering wheel 26 and the pinion 27, respectively. A variety of torque sensors are known in the art and can be used with the present invention.

One particular type of torque sensor for use with the present invention includes an elongated torsion bar fixed at one end to the first steering shaft section 82 and fixed at its other end to the second steering shaft section 84. The steering shaft sections are coaxially aligned and are relatively rotatable with respect to each other. During a steering maneuver, the operator turns the steering wheel 26. If the vehicle wheels are subject to steering resistance, the torsion bar twists in response to the amount of applied torque permitting relative rotational motion to occur between the two shaft sections 82, 84. A Hall effect device is connected to the shaft sections 82, 84 and generates an electrical signal indicative of the direction and the amount of relative rotation therebetween. The amount of relative rotation is indicative of the amount of applied torque. A torsion bar torque sensor is disclosed in the above-incorporated U.S. patent application Ser. No. 496,619.

Figure 9:
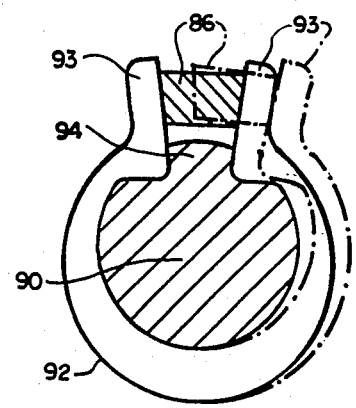
FIG. 9 is a side elevational view partially in section taken along line 9—9 of FIG. 7.
Figure 8:
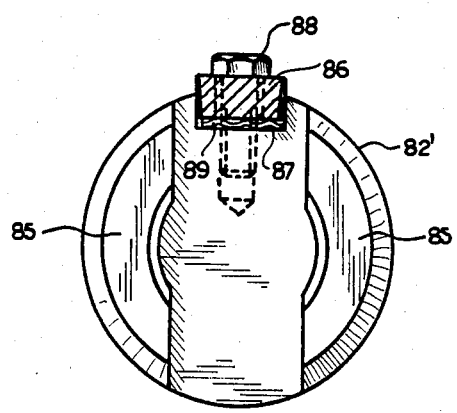
FIG. 8 is a side elevational view partially in section taken along line 8—8 of FIG. 7 with parts removed for clarity.

Referring to FIGS. 7-10, a preferred embodiment of a resilient connecting member and torque sensor for use with the present invention is shown. The first steering shaft section 82' includes spaced apart tangs 85, and a drive pin 86 mounted in receiving slot 87 by means of a bolt 88 received in a threaded opening in the first shaft section 82'. A wave washer 89 is positioned between the drive pin 86 and the bottom of receiving slot 87 and permits vertical adjustment of drive pin 86 in the receiving slot 87. Slot 87 prevents any rotational movement of drive pin 86 about an axis defined by the mounting bolt 88. Second shaft section 84' has a mounting member 90 fixed at its end facing the first shaft section 82'. An extension member 91 protrudes from the second shaft section 84' and is received in the spaced apart tangs 85. The purpose of the extension member 91 and the tangs 85 is to limit the amount of relative rotation between the first shaft section 82' and the second shaft section 84' in a known manner. A CIR-CLIP 92 is mounted on the mounting member 90 and includes spaced apart lugs 93 that receive the drive pin 86. Mounting member 90 includes an extension arm 94 which extends between lugs 93. The extension arm 94 functions as a retaining support and as lug retaining means. As is depicted in FIG. 9, when there is no relative rotation between the first shaft section 82' and the second shaft section 84', lugs 93 are both in contact with the drive pin 86 and with the sides of extension arm 94. It will be appreciated that the drive pin 86 is coupled to the first shaft section 82' and the CIR-CLIP 92 and the mounting member 90 are coupled to the second shaft section 84'. Once relative rotation occurs between first shaft section 82' and second shaft section 84', the drive pin 86 will force one of the lugs 93 away from the extension arm 94 in a manner as is depicted in phantom in FIG. 9. The CIR-CLIP 92 thus functions as a bias spring which resists the relative rotation between the two shaft sections 82', 84'. The amount of relative rotation is a function of the spring rate of the CIR-CLIP 92 and the amount of applied torque. The amount of initial spring loading or amount of preloading of the CIR-CLIP 92 can be adjusted by the verticle position of the drive pin 86 adjusted by means of bolt 88 and wave washer 89 in receiving slot 87. The greater the preload, the more torque is required across the shaft sections 82', 84' before relative rotation occurs. This CIR-CLIP arrangement gives a more "mechanical feel" or "positive feel" to operator steering than exists in a torsion bar arrangement. This is particularly beneficial to insure that initial manual steering efforts move the piston 16 to establish the pressure differential in the hydraulic steering motor 12. Details of a CIR-CLIP arrangement are disclosed in British Pat. No. 1,603,198 and is fully incorporated herein by reference.

Figure 10:
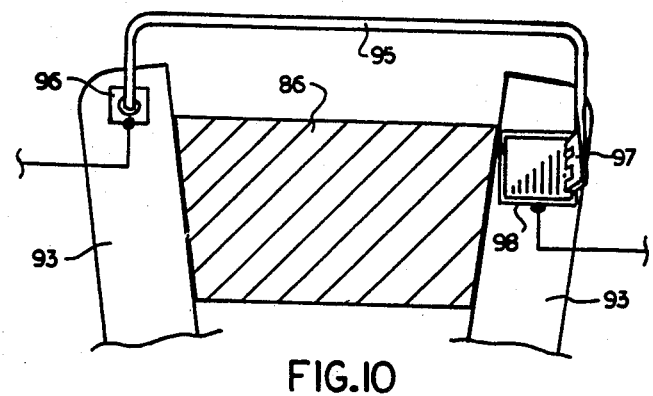
FIG. 10 is an enlarged, side elevational view of a portion of the apparatus shown in FIG. 7.

The amount of relative rotation using the CIR-CLIP arrangement just described can be measured in a number of various ways. For example, a Hall effect device can be utilized. FIG. 10 shows a resistance measurement technique for measuring the amount of relative rotation in which an electrically conductive arm 95 is fixed to one lug 93 on a substrate 96. The other end of arm 95 has fingers 97 in sliding contact with a resistive strip mounted on a substrate 98 which is mounted on the other lug 93. The resistive strip is laser trimmed in a known manner so that the amount of resistance between substrate 96 and substrate 98 varies depending on the position of fingers 97 on the resistive strip. It will be appreciated that the amount of resistance will change an equal amount for an equal amount of relative rotation between the shaft sections 82', 84' independent of the direction of the relative rotation. The amount of the resistance is a function of the amount of applied torque.

Referring to FIGS. 1 and 3, the electronic control unit 70 is connected to the torque sensor 80 through wires 90 and a speed sensor 92. As mentioned, the electronic control unit 70 throttles valve 42 as a function of vehicle parameters and in particular vehicle speed and the amount of applied steering torque as sensed by the torque sensor 80.

When the vehicle is not subject to steering maneuver, or the vehicle wheels are not subject to steering resistance during a steering maneuver, such as occurs on ice, no relative rotation occurs between first and second shaft sections 82, 84. The valve 42 is throttled under such a condition by the electronic control unit 70 to a substantially closed condition. As the amount of applied torque increases to accomplish a steering maneuver, the valve 42 is accordingly opened by the electronic control unit 70 to permit an increase in the volume of fluid pumped from pump 38.

The directional control valve 50 includes a fully enclosed housing 100 having a spaced apart upper wall 102, lower wall 104 and a cylindrical side wall 106. The upper wall 102 is secured to the side wall 106 by means of bolts 114 and the bottom wall 104 is secured to the side wall 106 by means of bolts 116. The side wall 106 and the upper and lower walls of the housing 100 form a chamber 118. Seals (not shown) are used between the upper wall and the side wall and the bottom wall and the side wall to provide a fluid tight chamber.

A valve block 120 is disposed within chamber 118 and divides the chamber 118 into an upper chamber 122 and a lower chamber 124. The valve block 120 is cylindrical in shape and slidably disposed within chamber 118. Upper chamber 122 and lower chamber 124 are sealed from fluid communication with each other by annular seals 126, 128, respectively disposed in annular recesses 130, 132 of the side wall 106. The annular seals are slidably and sealably engaged by the valve block 120.

Conduit 56 is connected to the directional control valve 50 through port 134 in bottom wall 104. Conduit 54 is connected to the directional control valve 50 through port 136 in the upper wall 102. Conduit 52 is connected to the directional control valve 50 through port 138 in side wall 106.

Valve block 120 includes an annular recess 139 which is in communication with the port 138. A central passage 140 is in communication with recess 139 and extends transverse therefrom. Passages 142, 144 extend transverse from the central passage 140 and are in communication therewith. The transverse passages 142, 144 communicate with upper chamber 122 and lower chamber 124, respectively. Passages 142, 144 are also in communication with each other.

A structure 146 is secured in a recess 148 of wall surface 150 of the valve block 120. The structure 146 has an outer face 152, an inner face 154 and divides the upper chamber 122 into two subchambers 156, 158. An orifice 160 extends through the structure 146. Outer face 152 includes flat wall portion 162 that is parallel with the inside wall surface of the upper wall 102. Annular seal 164 is disposed in an annular recess 166 in the inside wall surface of the upper wall 102. Flat wall portion 162 sealingly engages against annular seal 164 when the valve block 120 is slid to its maximum extent against upper wall 102. In such a position, subchamber 158 is blocked from fluid communication with subchamber 156.

A reed valve 170 is secured at one end 172 to the valve block 120 by means of a bolt 174. The other end 176 of the reed valve 170 is self-biased against surface 178 of valve block 120. The reed valve 170 covers the opening to passage 142 when the reed valve 170 is in its normally closed position. The surface area of the reed valve 170 facing subchamber 158 is substantially larger than the exposed surface area of the reed valve 170 facing the passage 142. If the area ratios are, for example, 20:1, the hydrostatic pressure in passage 142 would have to be greater than 20 times the hydrostatic pressure in subchamber 158 plus an amount to overcome the self-bias force to open the reed valve 170. After the reed valve 170 is open, it will remain open until the pressure in subchamber 158 equals the pressure in passage 142 at which point, the self-bias force of reed valve 170 will cause it to close. This design provides a substantial amount of hysteresis in pressure differentials required to open and close the reed valve.

A structure 190, identical to the structure 146, is disposed in the lower chamber 124 and is secured in a recess 192 of wall surface 194 of valve block 120. The structure 190 has an inner face 196, an outer face 198 and divides the lower chamber 124 into two subchambers 200, 202. An orifice 204 extends through the structure 190. Outer face 198 includes flat wall portion 206 that is parallel with the inside wall surface of the lower wall 104. Annular seal 208 is disposed in an annular recess 210 in the inside wall surface of the lower wall 104. Flat wall portion 206 sealingly engages against the annular seal 208 when the valve block 120 is slid to its maximum extent against wall 104. In such a position, subchamber 202 is not in fluid communication with subchamber 200.

Reed valve 220 is secured at one end 222 to the valve block 120 by means of a bolt 224. The other end 226 of the reed valve 220 is self-biased against surface 228 of the valve block 120. The reed valve 220 covers the opening to passage 144 when the reed valve is in its normally closed position. The surface area of the reed valve 220 facing subchamber 202 is substantially larger than the exposed surface area of the reed valve 220 facing the passage 144. If the area ratios are, for example, 20:1, the hydrostatic pressure in passage 144 would have to be greater than 20 times the hydrostatic pressure in subchamber 202 plus an amount to overcome the self-bias force to open the reed valve 220. After the reed valve 220 is open, it will remain open until the pressure in subchamber 202 equals the pressure in passage 144 at which point the self-bias force of reed valve 220 will cause it to close. As mentioned, this design provides a substantial hysteresis in pressure differentials required to open and close the reed valve.

The axial dimension of the annular recess 139 is sufficient to continue fluid communication between the annular recess 139 and orifice 138 when the slide block 120 is slid to its maximum extent toward either top wall 102 or bottom wall 104.

Cylindrical side wall 106 includes an orifice 234 which projects through the side wall 106 and communicates with the subchamber 156. The check valve 58 is connected to orifice 234 through the conduit 62 such that the check valve 58 is in fluid communication with the subchamber 156. Check valve 58 is also in fluid communication with the reservoir 44 through the conduit 66.

The cylindrical side wall 106 further includes an orifice 236 which projects through the side wall 106 and communicates with the subchamber 200. The check valve 60 is connected to the orifice 236 through conduit 64. The check valve 60 is in fluid communication with the subchamber 200. Check valve 60 is also in fluid communication with the reservoir 44 through the conduit 66. Check valves 58, 60 are designed to unseat and permit fluid to return to the reservoir 44 once pressure acting on the check valves 58, 60 from subchambers 156, 200, respectively, exceeds a predetermined value.

Figure 3A:
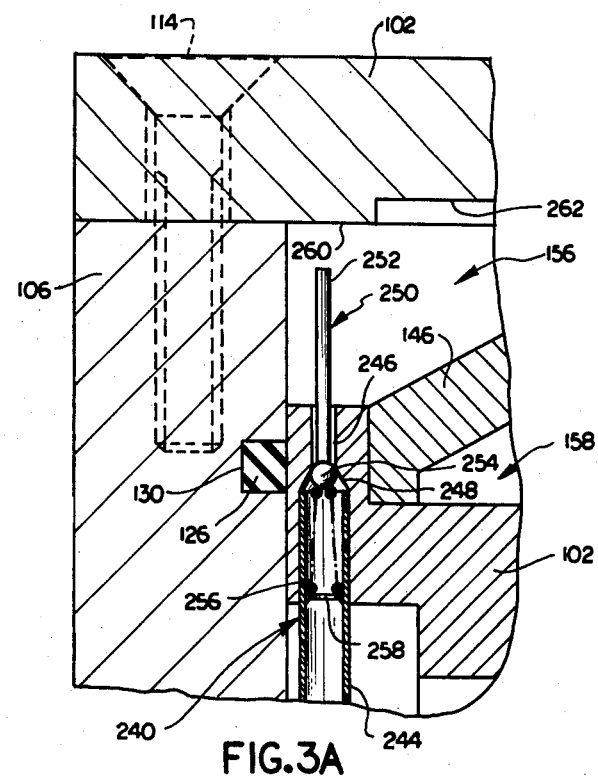
FIG. 3A is an enlarged view partially in section of a portion of the directional control valve of FIG. 3.

Referring to FIGS. 3 and 3A, the valve block 120 includes two valve assemblies 240, 242 that both extend between subchambers 156, 200. Each of these valve assemblies 240, 242 are similar in structure and operation. Therefore, only one such valve assembly will be described in detail, it being understood that the other valve assembly is similarly constructed and operates in a similar manner. Valve assembly 240 includes a first passageway 244, which opens to subchamber 200 and a second passageway 246 which opens to subchamber 156. Pasageways 244 and 246 are connected by a tapered passageway section 248. An integral ball and shaft member 250 is provided with a shaft portion 252 extending through passageway 246 and ball portion 254 received in the tapered passageway section 248. Ball portion 254 has a diameter greater than second passageway section 246 and less than first passageway section 244. The diameter of shaft portion 252 is less than the diameter of the second passageway section 246. Spring 256 is held at one end by stop surface 258 fixed in first passageway section 244 and engages ball 254 to bias the ball against the tapered passageway 248 thereby switchably sealing the first and second passageways from fluid communication therebetween.

Upper wall 102 includes an annular land surface 260 spaced from the inside wall surface 262 of the upper wall 102 and which has a diameter less than that of the inner wall surface of cylindrical side wall 106. When the valve block is slid to its farthest extent toward upper wall 102 such that flat wall surface 162 seals against seal 164 in the inner wall surface 262 of upper wall 102, the distal end of shaft portion 252 engages land surface 260 and unseats ball 254 to provide fluid communication between subchambers 156, 200.

The inside wall of the lower wall 104 has an annular land surface 264 having a smaller diameter than that of the inner wall surface of the cylindrical side wall 106. Similar to the manner described above, when the valve block 120 is slid to its farthest extent toward lower wall 104, the valve assembly 242 is opened and provides fluid communication between subchambers 156, 200.

Figure 4:
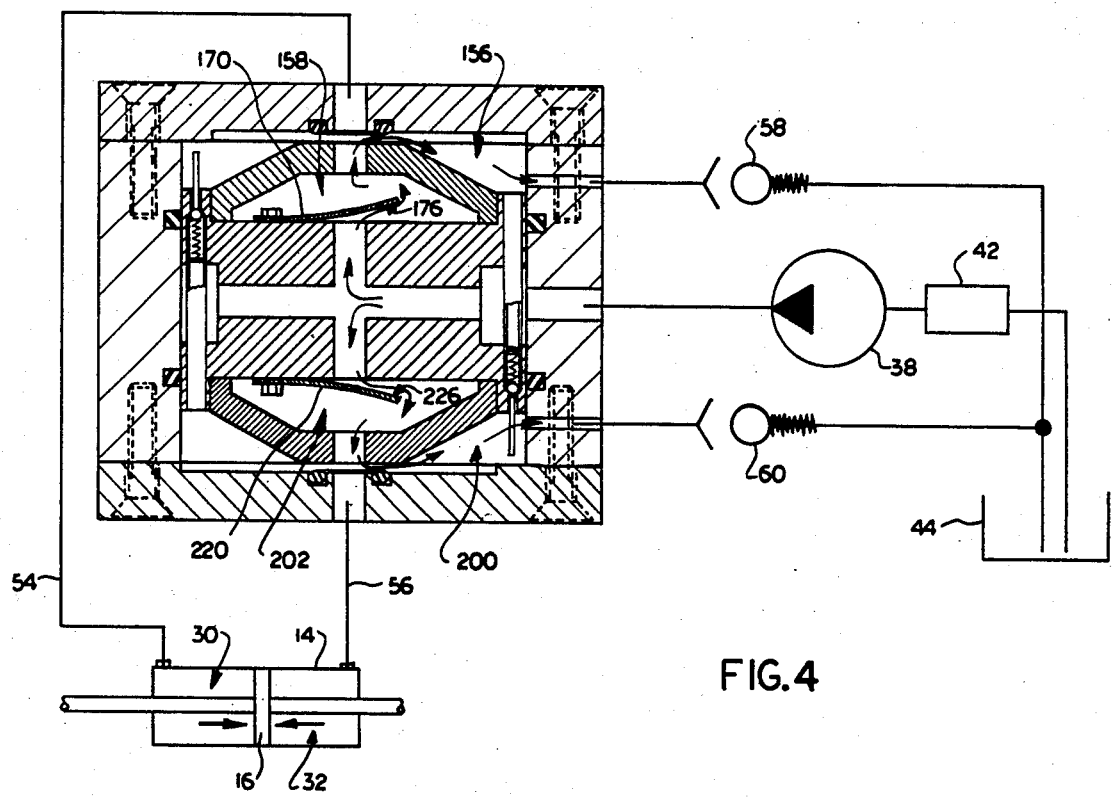
FIG. 4 is a partial fragmentary view and partial schematic illustration similar to FIG. 3 showing the directional control valve in a neutral condition and the vehicle not under a steering maneuver.
Figure 3B:
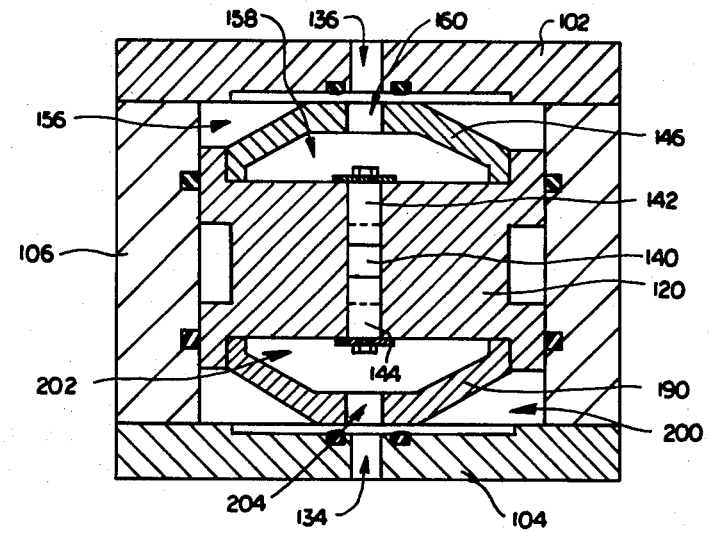
FIG. 3B is a view as seen from the plane of line 3B—3B of FIG. 3.

When the pump 38 is not pumping, i.e., the vehicle motor is off, the reed valves 170, 220 are in a normally closed position blocking the openings to passages 142, 144, respectively, as depicted in FIG. 3. When the pump 38 is pumping, i.e., the vehicle motor is on, and when the vehicle is not subject to a steering maneuver, the electronic control unit 70 substantially closes the inlet valve 42 and reduces the fluid flow output from the pump 38. Such a condition is depicted in FIG. 4. The pressure in chambers 30, 32 are equal and the piston 16 is stationary. There is no pressure differential signal from the hydraulic motor 12. The fluid from the pump 38 enters the subchambers 158, 156 and subchambers 202, 200 by opening the reed valves 170, 220, respectively. The reed valves open when the fluid pressure within its associated transverse passage exceeds the fluid pressure within its associated inner subchamber 158, 202 by a multiple equal to the surface area of the reed valve exposed in the associated subchamber divided by the surface area of the reed valve exposed in its associated transverse passage plus an amount sufficient to overcome the spring bias force of the reed valve itself. Once the fluid pressure within subchambers 156, 200 exceed that required to unseat check valves 58, 60, respectively, fluid is returned to reservoir 44. The condition depicted in FIG. 4 is an unactuated condition.

Once a steering maneuver is initiated by manual rotation of the steering wheel 26, the pinion gear applies a mechanical force to the rack gear causing the rack gear to move thereby causing movement of the piston 16 within the housing 14. The manual rotation of the steering wheel 26 is coupled to the pinion gear 27 through the resilient member in torque sensor 80. The amount of relative rotation between the shaft sections 82, 84 is indicative of the amount of torque applied for the steering maneuver and the amount of force applied to the rack gear. As the piston 16 moves under this manually initiated effort, one of the chambers 30, 32 of the hydraulic motor begins to decrease in volume while the other chamber increases in volume, depending on the direction of the maneuver. The chamber decreasing in volume will increase in pressure and the chamber increasing in volume will decrease in pressure.

Figure 5:
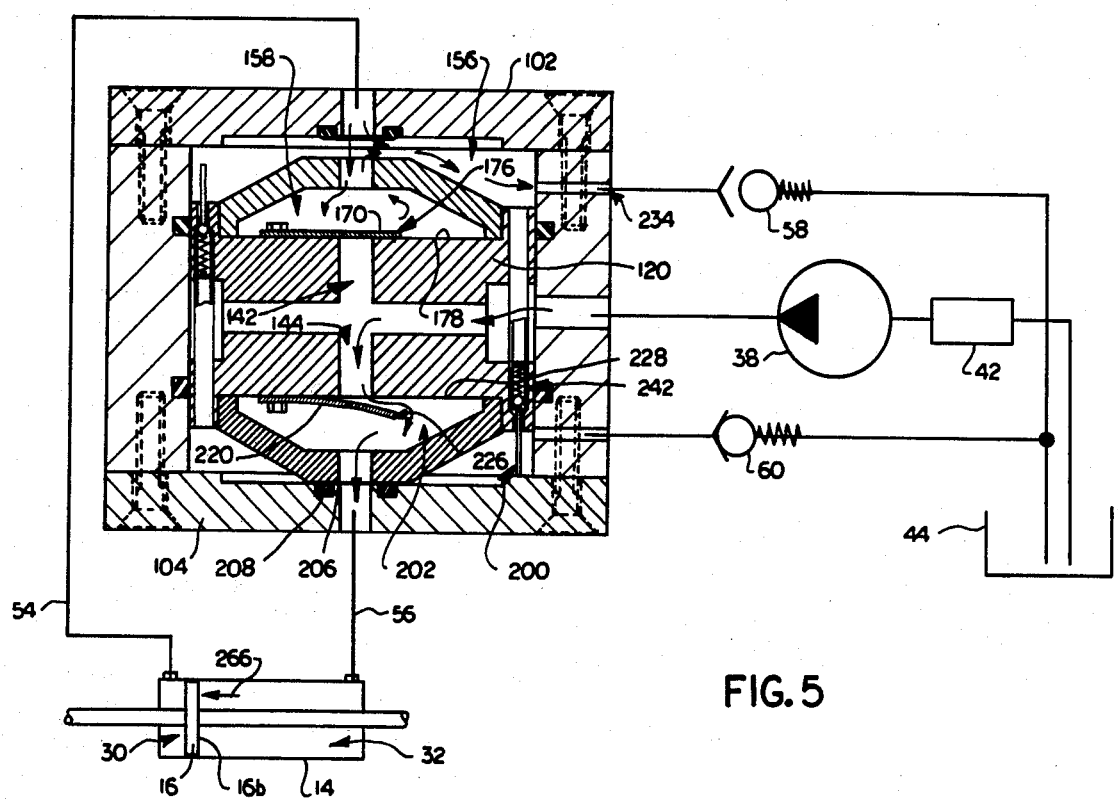
FIG. 5 is a partial fragmentary view and a partial schematic illustration similar to FIG. 3 showing the directional control valve in an actuated condition during a steering maneuver in one direction.

When a right turn is initiated, as depicted in FIG. 5, the piston 16 will move in the direction of arrow 266. During such movement, chamber 30 will be decreasing in volume while chamber 32 will be increasing in volume. The decrease in volume of chamber 30 will increase the fluid pressure within the chamber 30. The increase in volume of chamber 32 will decrease the fluid pressure within chamber 32. The pressure differential between chambers 30, 32 is a pressure signal from the hydraulic motor 12. This pressure signal is conveyed to the directional control valve 50 through conduits 54, 56. The decreasing pressure in chamber 32 decreases the pressure in subchambers 200, 202. The decreasing pressure in subchamber 202 will momentarily cause a decrease in pressure in the transverse passages 142, 144. The pressure in the transverse passage 144 will remain greater than the decreasing pressure in subchamber 202 thus maintaining the free end 226 of the reed valve 220 away from the surface 228 of valve block 120. Once a reed valve is open, it will remain open as long as the pressure in its associated transverse passage remains slightly greater than the pressure in its associated subchamber.

The increasing pressure in chamber 30 will cause an increase in pressure in subchambers 156, 158. The pressure in subchamber 158 will be equal to or greater than the pressure within the transverse passage 142 because of the momentary pressure drop in passage 142, thus moving the free end 176 of reed valve 170 against the surface 178 of the valve block 120. Fluid communication is thereby blocked between subchamber 158 and transverse passageway 142. Once the reed valve 170 closes, the ratio of pressures, as discussed above, would have to be present to again open the reed valve.

The torque sensor 80 sends a signal to the electronic control unit 70 indicating the amount of torque the operator is applying to the steering wheel 26 to make the steering maneuver. The electronic control unit 70 generates a signal to open the inlet valve 42 an amount commensurate with the measured torque and the vehicle speed. The opening of inlet valve 42 permits the pump 38 to pump more fluid to the direction control valve 50. There is a delay between the time the signal is sent to the inlet valve to open it and the time the pump 38 begins to build fluid pressure in the passages of the valve block 120. This delay permits the slight pressure drop to occur in the passages 142, 144 upon initiation of a steering maneuver and the build up of pressure in the subchamber 158 which in turn permits its associated reed valve 170 to close.

Since the pressure acting against surface 178 is greater than the pressure acting against surface 228, the valve block 120 slides toward lower wall 104 causing flat wall portion 206 to sealingly engage against annular seal 208. Valve assembly 242 contacts its associated land and opens to provide fluid communication between subchambers 200, 156. The opening of valve assembly 242 permits fluid in subchamber 200 to escape and permit the wall portion 206 to seat against the seal 208. The check valve 58 remains open to return fluid leaving chamber 30 to the reservoir 44. First orifice 234 and the narrow passageway section of valve assembly 242 are of sufficient size ratio to have check valve 60 close. The fluid being pumped into chamber 32 acts against face 16b to aid in the manually initiated movement of the piston. The directed pressure against the piston assists the manually initated steering maneuver.

Once the rotation of the operator steering wheel is stopped, the movement of piston 16 is mechanically stopped. Upon this occurrence, an excess amount of pressure temporarily occurs in subchamber 202 which (i) closes reed valve 220, (ii) acts against surface 228 and (iii) pushes the valve block away from the lower wall 104 back to the position shown in FIG. 4. The pressure backlash that causes the valve block 120 to move away from the lower wall 104 occurs because of a time delay in reducing the fluid flow from pump 38 which is controlled by inlet valve 42. When the torsion signal from the torsion sensor 80 indicates the end of a steering maneuver, the electronic control unit 70 generates a signal to throttle the valve 42 substantially closed. The pump continues to pump fluid after the steering maneuver is completed and the valve 42 is closed because of fluid remaining in the lines. Because the piston 16 is stationary upon completion of the steering maneuver, fluid pressure builds in subchamber 202 to an amount that exceeds the pressure in passageway 144 and temporarily closes reed valve 220. Pressure in subchamber 202 exceeds the pressure in subchamber 158. The excess pressure in subchamber 202 acts against face 228 and pushes block 120 away from wall 104.

Figure 6:
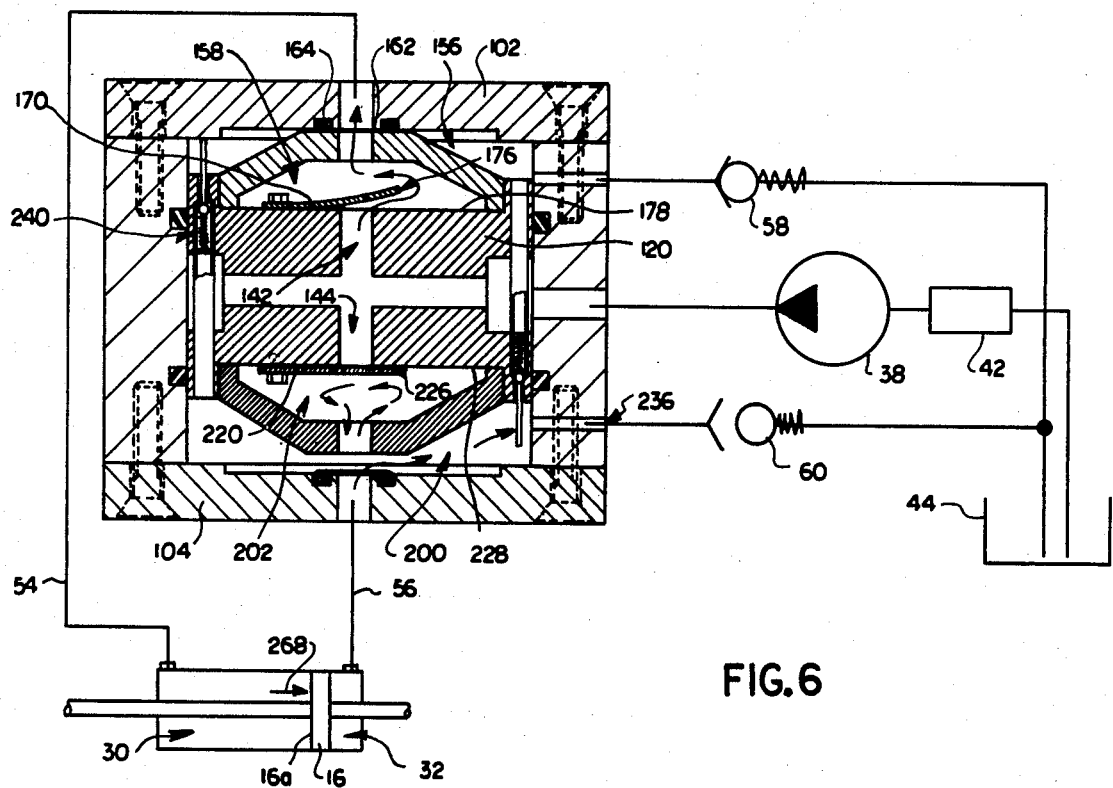
FIG. 6 is a partial fragmentary view and a partial schematic illustration similar to FIG. 3 showing the directional control valve in an actuated condition during a steering maneuver in another direction.
Figure 7:
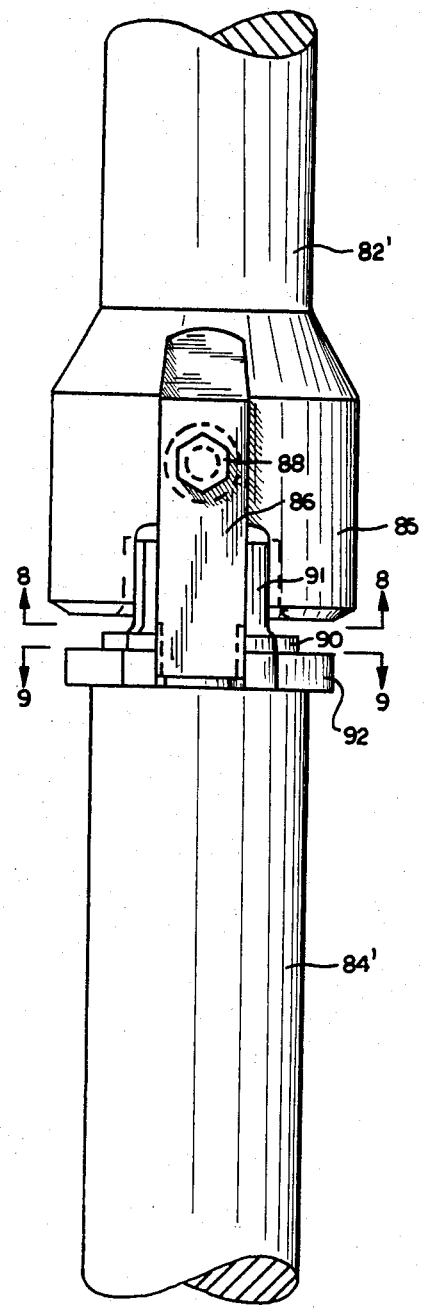
FIG. 7 is a top plan view showing a resilient connection between the input shaft and the output shaft.

Referring now to FIG. 6, when a left turn is initiated by appropriate movement of the steering wheel 26, the piston 16 will be mechanically driven through the rack and pinion connection in the direction of arrow 268. Movement of the piston 16 in the direction of arrow 268 causes decreasing volume and increasing fluid pressure in chamber 32 and causes increasing volume and decreasing fluid pressure in chamber 30. Because of the decreasing pressure in chamber 30 and in subchamber 158 and because of the time needed to build pressure in the passages of the valve block, a momentary decrease in pressure will occur in the transverse passages 142, 144. The reed valves 170, 220 work in an opposite manner from that described above with regard to a right turn maneuver.

In particular, the increase in pressure in chamber 32 causes an increasing pressure in the subchambers 200, 202. The pressure in the subchamber 202 is equal to or greater than the pressure in the transverse passage 144 because of the momentary pressure drop in transverse passage 144 and the pressure increase from chamber 32. The free end 226 of the reed valve 220 moves against the surface 228 of the valve block 120. The decreasing pressure in chamber 30 causes a decrease in pressure in subchambers 156, 158. The pressure in transverse passage 142 remains greater than the pressure in subchamber 158. This pressure differential retains the free end 176 of the reed valve 170 away from the surface 178 of valve block 120. After a time delay, fluid pressure builds in the passages 142, 144.

Since the pressure against the surface 228 is greater than the pressure against surface 178, the valve block 120 will slide toward the upper wall 102 causing the flat wall portion 162 to sealingly engage against annular seal 164. Valve assembly 240 contacts its associated land and opens to provide fluid communication between subchambers 156, 200. The check valve 60 remains open to return fluid leaving chamber 32 to the reservoir 44. Orifice 236 and the narrow passageway section of valve assembly 240 are sufficient size ratio to have check valve 58 close. The fluid being pumped into chamber 30 acts against face 16a and assist in the manually initiated steering maneuver.

Once the left turn steering maneuver is completed, the directional control valve 50 operates in a similar manner as described above with reference to a right turn maneuver. Pump 38 continues to pump fluid to subchamber 158 after valve 42 closes because of the remaining fluid in the lines. Since piston 16 is no longer moving, pressure builds up in subchamber 158. The excess amount of pressure in subchamber 158 temporarily closes reed valve 170 and pushes the valve block 120 away from the upper wall 102 and back to the position shown in FIG. 4.

Figure 2:
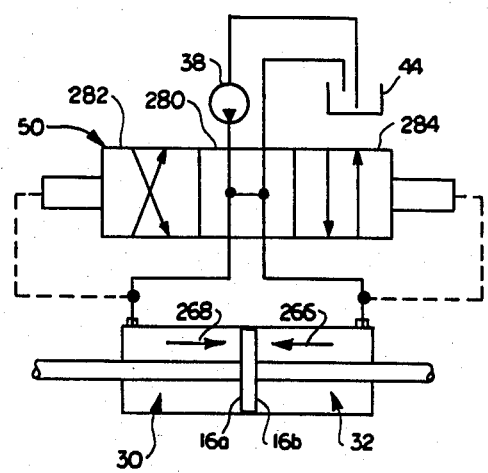
FIG. 2 is a simplified, schematic illustration of the directional control valve of the present invention.

FIG. 2 schematically depicts the various valve functions of the directional control valve 50. When the vehicle is not subject to a steering manuever, pressures within chambers 30, 32 are equal and the hydraulic motor 12 generates no pressure differential signal. This is an unactuated condition. The valve 50 in an unactuated condition has envelope 280 in communication with the pump and hydraulic motor. Fluid passes through the valve and is returned to the reservoir 44. This is also an on-center condition.

During a right turn steering maneuver, the steering wheel is manually rotated in the appropriate direction to initiate the turn. The piston moves in the direction of arrow 266 as a result of the mechanical interconnection between the steering wheel and the piston through the rack and pinion gear set. The directional control valve 50 responds to the pressure differential signal created by the piston movement which moves the valve block 120 to place envelope 282 in communication with the pump and the hydraulic motor. This is an actuated condition. Fluid from the pump 38 is directed to the expanding chamber 266 to act against face 16b to assist the manually initiated steering maneuver.

When a left turn is initiated by manual rotation of the operator steering wheel, the piston 16 moves in the direction of arrow 268. The increasing pressure in chamber 32 and the decreasing pressure in chamber 30 due to the piston movement establishes another pressure differential signal. The directional control valve 50 responds to the pressure signal created by the piston movement which moves valve block 120 to place envelope 284 in communication with the pump and the hydraulic motor. This is another actuated condition. Fluid from the pump 38 is directed to the expanding chamber 30 to act against face 16a to assist the manually initiated steering maneuver.

Upon completion of a steering maneuver, the pressure backlash, described above, moves the valve block to place envelope 280 in communication with the pump and hydraulic motor. When the chamber pressure becomes equal, envelope 280 remains in communication with the pump and hydraulic motor.

This invention has been described with reference to preferred embodiments. Modifications and alterations may occur to others upon reading and understanding the specification. It is our intention to include all such modifications and alterations insofar as they come within the scope of the appended claims or the equivalent thereof.

What is claimed is:

1. A steering apparatus for turning vehicle wheels in response to turning of the vehicle steering wheel, said apparatus comprising:
    connection means for mechanically connecting a steering wheel to the vehicle wheels, and for turning said vehicle wheels upon turning of said steering wheel;
    a fluid reservoir;
    a pump having an inlet open to fluid in said reservoir and an outlet for delivering pressurized hydraulic fluid;
    a hydraulic motor in fluid connection with said pump to assist said turning of said vehicle wheels and producing a fluid pressure signal in response to movement of the connection means; and
    a valve in fluid communication with said pump and said hydraulic motor, said valve including fluid directing means responsive to said pressure signal for controlling fluid flow to said hydraulic motor, said fluid directing means in one condition responsive to the pressure signal for permitting the flow of fluid from said pump to said reservoir and in another condition responsive to the pressure signal for directing fluid flow to said hydraulic motor.

2. The steering apparatus of claim 1 wherein said connection means includes a pinion gear operatively coupled to the steering wheel and a rack gear operatively coupled to a piston of said hydraulic motor.

3. The steering apparatus of claim 1 wherein said fluid directing means includes a first reed valve connected between said pump and one side of said hydraulic motor, and a second reed valve connected between said pump and a second side of said hydraulic motor, each reed valve opening and closing fluid communication between said pump and its associated side of said hydraulic motor responsive to said pressure signal.

4. The steering apparatus of claim 3 wherein said valve further includes:
    a housing having a cylindrical side wall enclosed at its ends by a top wall and a bottom wall secured thereto; and,
    wherein said fluid directing means includes:
    a valve block slidably mounted in said housing and having a first wall facing said top wall and being in fluid communication with said one side of said hydraulic motor, a second wall facing said bottom wall and being in fluid communication with said second side of said hydraulic motor, and a passageway fluidly connecting said first wall with said second wall and being in fluid communication with said pump;
    said first reed valve operatively connected to said first wall and overlying an opening to said passageway in a normally closed condition; and
    said second reed valve operatively connected to said second wall and overlying an opening in said passageway in a normally closed condition.

5. A steering apparatus for turning vehicle wheels in response to turning of the vehicle steering wheel comprising:
    a hydraulic motor having two variable volume hydraulic chambers separated by a movable piston, means for coupling said piston mechanically to the vehicle wheels for turning the vehicle wheels upon movement of the piston, means for coupling said piston to the vehicle steering wheel to move the piston upon turning of the steering wheel, said piston movement causing pressure changes within said variable volume hydraulic chambers;
    a pump for supplying fluid under pressure to said hydraulic motor; and
    a valve in fluid communication with said pump and said motor, said valve including fluid directing means responsive to the pressure within said two variable volume hydraulic chambers for controlling fluid flow to said hydraulic motor.

6. The apparatus of claim 5 further including a reservoir for holding fluid, and wherein said valve directs fluid under pressure from said pump to a variable volume hyraulic chamber decreasing in pressure upon piston movement and directs fluid from a variable volume hydraulic chamber increasing in pressure to said reservoir.

7. The apparatus of claim 6 further including a check valve positioned in communication between said valve and said reservoir so that fluid in the variable volume hydraulic chamber increasing in pressure must exceed a predetermined pressure value before fluid is directed to said reservoir.

8. The apparatus of claim 6 wherein said fluid directing means includes a first reed valve connected between said pump and a variable volume hydraulic chamber, and a second reed valve connected between said pump and another variable volume hydraulic chamber, each reed valve being normally closed and opening to provide communication between said pump and its associated variable volume hydraulic chamber responsive to said changes in pressure within said two variable volume hydraulic chambers.

9. The apparatus of claim 8 wherein each chamber has an associated check valve switchably disposed between it and said reservoir, fluid being returned to said reservoir from a variable volume hydraulic chamber when its associated check valve is in communication therewith and when pressure in such chamber exceeds a value sufficient to unseat the associated check valve.

10. The apparatus of claim 6 further including:

a flow control valve for controlling the volume of fluid flow from said pump;

a torque sensor for generating a signal responsive to the amount of torque applied to said steering wheel during a steering maneuver; and an electronic control unit for controlling said flow control valve such that the volume of fluid flow from said pump is responsive to said torque sensor.

* * * * *